Dec. 23, 1958  H. KAUFMAN  2,865,447
FEEDING APPARATUS
Filed Dec. 6, 1954
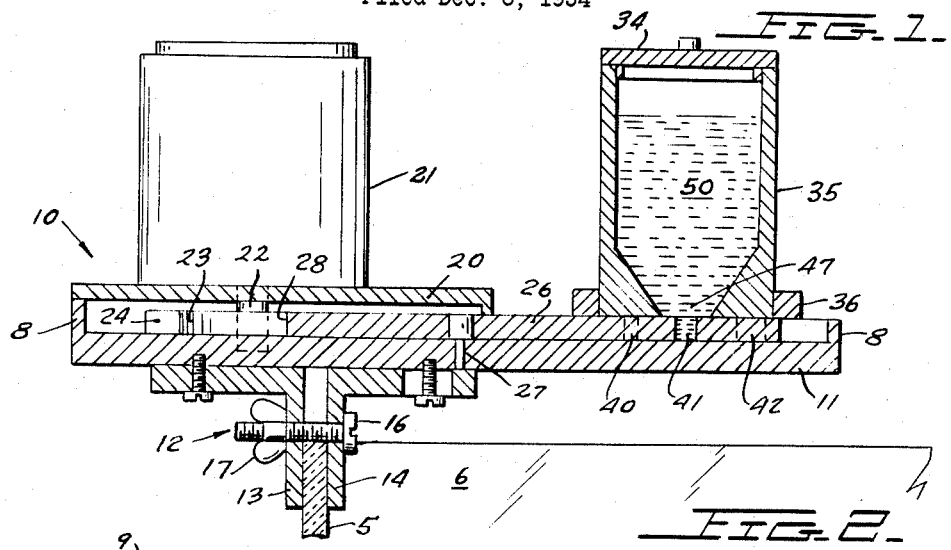
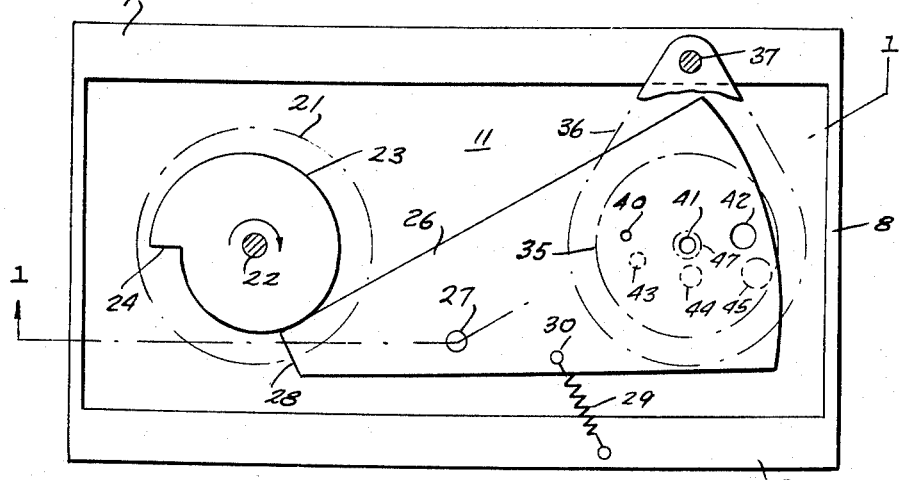
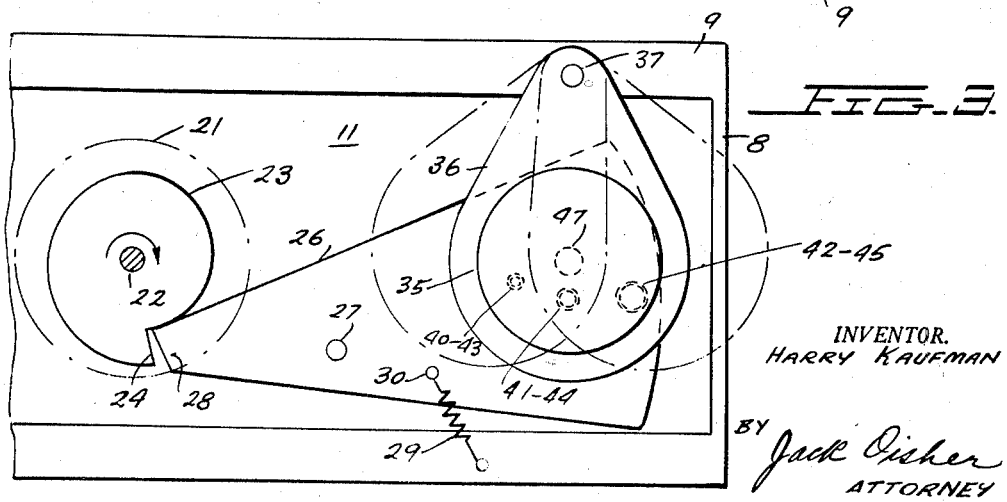
INVENTOR.
HARRY KAUFMAN
BY Jack Oisher
ATTORNEY

United States Patent Office 2,865,447
Patented Dec. 23, 1958

2,865,447

FEEDING APPARATUS

Harry Kaufman, New Rochelle, N. Y.

Application December 6, 1954, Serial No. 473,266

5 Claims. (Cl. 161—10)

This invention relates to food-feeding apparatus, and, more particularly, to apparatus for feeding food to fish and the like.

Known apparatus for feeding food to fish over a relatively long period of time are frequently deficient in the manner in which the food is discharged into the tank containing the fish. Fish, as a rule, have peculiar feeding requirements. First, they should be fed a predetermined amount of food at predetermined intervals, usually daily. Secondly, all of the food, preferably in a powdered state, should be discharged into the tank simultaneously. The latter requirement stems from the fact that the larger, more aggressive fish tend to monopolize the food as it is thrown into the tank. Hence, all of the food should be discharged into the tank immediately so that the larger fish are kept busy eating, affording an opportunity for the smaller fish to consume their fair share. If, however, the food is slowly discharged over a relatively long period of time, the larger fish will entirely monopolize all of the food as it enters the tank preventing the smaller fish from sharing to any great extent, with the consequence that the larger fish overeat and the smaller fish undereat, thereby impairing the health of both.

One object of the invention is to provide a feeding apparatus wherein predetermined quantities of food may be rapidly discharged into a receptacle at spaced intervals.

Another object of the invention is the provision of apparatus for feeding fish which can be readily mounted on any size or shape of fish tank.

A still further object of the invention is the provision of apparatus containing means for feeding different quantities of food depending upon the number of fish to be fed.

Still a further object of the invention is the provision of fish-feeding apparatus for uninterruptedly feeding fish for an extended period of time.

Another object of the invention is to provide apparatus for rapidly discharging predetermined amounts of fish food in granular or pulverulant form in an automatic manner.

These and other objects of the invention will be best understood from the following description.

The apparatus according to the invention provides a device for rapidly and automatically discharging predetermined amounts of food into the tank containing the fish over regularly spaced, usually daily, intervals. To that end, the apparatus is provided with a hopper mechanism for storing a quantity of food sufficient to meet the daily requirements of the fish for a reasonably long period, for example, two weeks or more. The hopper is readily accessible from the outside of the apparatus for easy replenishment of the store of food therein. The outlet port of the hopper communicates with one side of an aperture of given size in a transfer plate when the latter occupies a first or charge position. With the transfer plate in the charge position, the other side of the aperture is closed off by a solid portion of an underlying discharge plate, which also serves as an enclosure or support. The transfer plate is transferable or slideable in the enclosure to a second or discharge position, whereat the other side of the aperture in the transfer plate communicates with a discharge port or opening in the discharge plate, which port is located over the fish tank. Means are provided to maintain the transfer plate in the charge position for sufficient time to fully charge the opening therein with food from the hopper and until the predetermined feeding time recurs. At that time, the transfer plate is rapidly shifted or displaced or pivoted to the discharge position carrying along therewith the food contained in the opening, which food, in the discharge position, then communicates with the discharge port and is thus gravity-fed into the tank. The displacement of the transfer plate is relatively instantaneous whereby all of the food carried thereby is almost instantaneously discharged into the fish tank. While the transfer plate is being displaced from the charge to the discharge position and back to the charge position, the outlet port of the hopper is sealed off thus preventing further food from being fed until the transfer plate returns to the charge position.

In accordance with one aspect of the invention, the transfer plate actuating mechanism is comprised as follows. The transfer plate is urged towards the discharge position by suitable biasing means such as a tension spring, but is prevented from moving by a motor-driven cam which maintains the plate in the charge position. The motor preferably rotates the cam at one R. P. D. (revolution per day). The profile of the cam is chosen such that when desired, the transfer plate, urged by the biasing means, is enabled to rapidly shift to the discharge position, thereupon discharging the food, and thereafter returned to the charge position.

In accordance with a further aspect of the invention, the transfer plate is provided with three or more apertures of varying size for holding different quantities of food. The apertures communicate, in the discharge position of the plate, with a common discharge port, or separate discharge ports, respectively, in the discharge plate. The hopper is slidably mounted on the housing so as to be readily aligned with any one of the apertures in the plate to cooperate therewith to feed varying amounts of food to the fish as desired.

The apparatus of the invention is preferably provided with a clamping attachment whereby it may be readily mounted on only one wall of a fish tank, and is thus adapted for mounting on tanks of different size and shape.

The invention will now be described with reference to the accompanying drawing, wherein:

Fig. 1 is a cross-sectional view of a fish feeder according to the invention mounted in position on a fish tank;

Fig. 2 is a top plan view of the feeder with the motor and top cover plate removed to show the interior;

Fig. 3 is a view of the feeder similar to that of Fig. 2 illustrating the different positions occupied by the parts.

Referring now to Fig. 1, a fish feeder 10 according to the invention is shown mounted in position on one wall 5 of an ordinary fish tank 6 to project over the top opening of the tank. Figs. 2 and 3 show detailed views of the fish feeder construction, whereby the desired objects of the invention are realized. The feeder 10 comprises a lower discharge plate and support 11 comprising a flat metal plate having a raised rim 8 along the periphery thereof which is wider at the front and rear 9. To the bottom side of the discharge plate 11 is secured a clamping mechanism 12. The clamp 12 comprises a pair of L-shaped brackets 13, 14, of which the left bracket 13 is fixedly mounted on the discharge plate 11 and the right bracket 14 is slideably mounted thereon. Connecting the two brackets is a bolt 16 and wingnut 17. It will be observed that the clamp 12 is disposed at approximately the center of gravity of the feeder for easier mounting. In mounting the feeder 10, the downwardly projecting portions of the brackets 13, 14 are slipped over and around the rim 5 of the fish tank 6 until the bolt 16 is engaged. Thereupon, the wing-nut 17 is tightened, slideably moving the bracket 14 towards its counterpart 13 until the rim 5 is tightly clamped therebetween.

Above the discharge plate 11 and spaced therefrom is secured a plate 20 serving as a support for a motor 21. The plate 20 is mounted on the rim portions 8, 9 of discharge plate 11. The motor 21 is electrically operated and adapted to provide by suitable gearing (not shown) rotation of its output shaft 22 at a velocity of, for example, one revolution per day (R. P. D.). A cam 23, keyed and secured to the motor output shaft 22, is disposed and mounted for rotation in the space between the discharge plate 11 and the motor mount 20. The cam 23 has a profile designed to impart a sudden movement to another member at a particular time once each revolution thereof. To this end, the cam profile (Fig. 2) is provided with a sudden interruption or cam lobe 24 whereat its diameter sharply decreases. With reference to Fig. 2, the rotation of the cam 23 is in a clockwise direction.

A truncated, triangular-shaped, transfer plate 26, pivotably mounted 27 on the discharge plate 11, has one end 28 in engagement with the cam profile. A tension spring 29, secured to the rim 9 of the discharge plate 11 and a point 30 of the transfer plate 26 on the side of the pivot 27 remote from the bearing end 28, urges the transfer plate into engagement with the surface of the cam. Hence, the position of the transfer plate is determined by the portion of the cam profile engaged by the bearing end 28 of the transfer plate 26.

A hopper 35, provided with a detachable cover 34, is secured to a mounting plate 36, which, in turn, is pivotably mounted by means of an adjustable screw 37 to the rear rim 9 of the discharge plate 11. The bottom surfaces of the hopper 35 and associated mount 36 are flat and lie in the same plane. The transfer plate 26, which lies beneath the hopper 35, has a flat upper surface adapted to mate with the bottom surfaces of the hopper 35 and mount 36. The mating surfaces are made with a finish sufficient to produce a smooth wiping contact therebetween. That is to say, the hopper and mount and the transfer plate abut each other very closely such that there are no appreciable gaps or openings therebetween. The same is true of the bottom surface of the transfer plate 26 and the mating upper surface of the discharge plate 11. In short, the transfer plate 26 is in wiping contact with the discharge plate 11 on one side, and with the hopper 35 and mount 36 on the other side.

The transfer plate 26 is provided with a plurality of, for example, three or more, apertures of different size passing completely therethrough and designated, respectively, as 40, 41 and 42 (Fig. 2). The discharge plate 11 is likewise provided with three apertures of different size passing completely therethrough and designated, respectively, 43, 44 and 45. In the position of the parts shown in Figs. 1 and 2, which is the charge position, it will be observed that the apertures 40, 41, 42 in the transfer plate 26 are not aligned and hence do not communicate with the apertures 43, 44, 45 in the discharge plate 11. Further, the outlet port 47 of the hopper 35 communicates with the central aperture 41 of the transfer plate 26.

The position occupied by the parts in Figs. 1 and 2 is termed the charge position. In that position, fish food 50, in a granular or pulverulent form, disposed in the hopper 35 will be gravity fed through the outlet port 47 into the central aperture 41 in the transfer plate 26 until that opening is full. The size of the apertures 40, 41, 42, which may be conveniently labelled as small, medium and large, determines the amount of food to be fed into the tank; thus, the different sizes. The screw 37, which may lock the pivotable hopper mount 36 in any position, may readily be loosened, the mount 36, together, of course, with the hopper itself, pivoted to the right or left thereby causing the outlet port 47 of the hopper to communicate with either the smaller aperture 40 or the larger aperture 42, and the screw 37 then tightened to lock the hopper 35 and mount 36 in that position. As thus described, the hopper 35 may be selectively positioned to communicate with any one of the three apertures in the transfer plate 26 as desired. This is illustrated by the dotted lines in Fig. 3.

During most of the rotation of the cam 23, the parts of the apparatus of the invention occupy the position shown in Figs. 1 and 2, wherein the aperture in the transfer plate 26 then communicating with the hopper is filled with fish food. When the cam 23 is rotated by the motor 21 to a position where the cam lobe 24 is suddenly and instantly engaged by the bearing end 28 of the transfer plate 26 (this is illustrated in Fig. 3), the spring 29 instantly urges the right-hand portion of the plate 26 rapidly outward (downward in Fig. 3), whereupon, the aperture 40, 41, 42 in the transfer plate 26 are moved to a new position where they then communicate with the apertures 43, 44, 45 in the discharge plate 11, the latter apertures now serving as discharge ports, and any food contained in the former apertures 40, 41, 42 is gravity fed or rapidly discharged through the latter into the fish tank 6 over which they are suspended. Each of the apertures 43, 44, 45 in the discharge plate 11 serve as a discharge port, respectively, for the apertures 40, 41, 42 in the transfer plate. Alternatively, one large slot-shaped aperture, encompassing all three apertures in the transfer plate, may be provided in the discharge plate. The position just described, known as the discharge position, is shown in Fig. 3. Thereafter, the continuing rotation of the cam 23 causes the transfer plate 26 to slowly pivot back to the charge position, whereat the apertures in the transfer plate are once more filled with food.

The cycle of operations is preferably timed to occur once a day, as will be evident from the foregoing wherein a rotation of one R. P. D. is maintained and the cam has a single cam lobe. Where desired, however, or when necessary, two or more cam lobes may be provided on the cam 23, whereupon each time a lobe is engaged by the bearing end 28 of the transfer plate 26, fish food will be discharged into the tank. Hence, food can be fed to the fish as frequently as desired over any desired time interval. Further, it will be observed that the shape of the bearing end 28 is different from that of the cam lobe 24. This is to ensure a rapid shifting of the transfer plate when the lobe 24 is reached. It will further be noted that when the transfer plate is shifted from the charge to the discharge position, the outlet port 47 of the hopper 35 is sealed off by a solid portion of the underlying transfer plate. Hence, the transfer of further food from the hopper is prevented until the transfer plate returns to the charge position.

The apparatus of the invention offers the following advantages. As indicated hereinbefore, all of the food is almost instantaneously discharged into the tank. Hence, the larger fish are unable to completely monopolize the food thereby affording an opportunity for the smaller fish to consume their fair share. Further, the fish food which may be utilized in the apparatus of the invention may be in the conventional powdery or granulated state; thus, the food can be widely dispersed throughout the tank due to the transferring action of the transfer plate, further minimizing the danger of the larger fish monopolizing all of the food. Still a further advantage is the extreme convenience of the apparatus. By a simple rotation of the hopper and mount, different quantities of food are easily fed to the tank enabling different numbers of fish to be supplied with food by the same apparatus. A further advantage resides in the fact that the storage capacity of the hopper may be made of a suitable size sufficient to fill the needs of the fish for any desired time interval. Consequently, owners of the fish may leave them unattended for long periods without fear of starvation. Finally, the apparatus is simple to manufacture and assemble at a reasonably low cost, and is sufficiently flexible in its function to meet most requirements.

While the invention has been described in connection with one embodiment, it is to be understood that the invention is not to be limited thereto as other modifications will readily occur to those skilled in this art within the spirit and scope of the appended claims.

What is claimed is:

1. Apparatus for automatically feeding at predetermined intervals pulverulent food to fish and the like in a tank, comprising a discharge plate having a discharge port, means for mounting said discharge plate over said tank with said discharge port communicating with said tank, a pivotable transfer plate slideably mounted on said discharge plate, said transfer plate having at least one aperture of predetermined size for carrying a given quantity of food, a hopper mounted over said transfer plate and accessible to the outside for storing a quantity of pulverulent fish food, said hopper having an outlet port communicating with said aperture in said transfer plate when the latter occupies a first charge position, said transfer plate having a second discharge position displaced from said first position where the aperture therein communicates with said discharge port in said discharge plate, a rotatably mounted cam coupled to said transfer plate, said cam having a profile adapted to maintain the transfer plate in its charge position for a relatively long period of time and periodically to displace substantially instantaneously said transfer plate to said discharge position, whereby all of the pulverulent food in said aperture in said transfer plate may be discharged simultaneously into said tank, and motor means mounted over said cam and coupled to said cam for rotating the latter continuously whereby food is automatically fed into the tank at periodic intervals, said cam lying over said discharge plate and underneath said motor means.

2. Apparatus as claimed in claim 1 wherein the motor means includes an electric motor mounted on upstanding rim portions of said discharge plate, and the hopper is also mounted on an upstanding rim portion of said discharge plate.

3. Feeding apparatus for automatically feeding pulverulent food to fish in a tank, comprising means for mounting said apparatus on one wall of said tank, a discharge plate constituting the bottom of said apparatus and having a plurality of spaced discharge ports therein of different size all communicating with said tank, a pivotable transfer plate slideably mounted on and over and in wiping contact with said discharge plate, said transfer plate having a plurality of spaced apertures of different size passing completely therethrough and equal in number to that present in the discharge plate, a hopper adapted to hold a supply of pulverulent fish food mounted over and in wiping contact with said transfer plate, said hopper having an outlet port communicating with only one of said apertures in said transfer plate when the latter occupies a first charge position, means associated with said hopper for selectively positioning said hopper and its outlet port over another of the apertures in the transfer plate, said transfer plate having a second discharge position wherein the apertures therein communicate and are aligned with the apertures in the discharge plate, a rotatably mounted cam on said discharge plate and having a profile engaging one end of the transfer plate and controlling the position of the latter, a tension spring having one end secured to the discharge plate and the other end secured to a point of the transfer plate on the side of the pivot remote from said one end for urging said transfer plate from the first to the second position, said cam profile having a shape at which the transfer plate occupies the discharge position for a relatively long period of time and including a cam lobe enabling said transfer plate to be substantially instantaneously displaced by said spring to said second discharge position at predetermined intervals whereby all of the fish food in the aperture in said transfer plate may be substantially instantaneously gravity fed into said tank through the outlet port in the discharge plate, and motor means for rotating said cam to thereby actuate the apparatus.

4. As fish-feeding apparatus, the combination comprising a discharge plate having an aperture therein through which fish food may be discharged, a movable transfer plate mounted over said discharge plate, said transfer plate having a plurality of apertures therein of different size, a hopper for receiving a supply of pulverulent food mounted over said transfer plate and including an outlet port, said transfer plate having a charge position whereat one of the apertures therein communicates with said hopper outlet port and a discharge position spaced from the charge position whereat said apertures communicate with the aperture in said discharge plate, means pivotably mounting said hopper on said discharge plate whereby said hopper may be selectively pivoted to one of a plurality of positions for selectively cooperating with the different-sized apertures in the transfer plate to feed varying amounts of food to the fish, and continuously-driven motor means coupled to said transfer plate for periodically instantaneously displacing said transfer plate over a given path from the charge position wherein an aperture therein is filled with pulverulent fish food to the discharge position wherein all of the pulverulent fish food may be simultaneously discharged through the aperture in the discharge plate, and for returning said transfer plate over the same given path to the charge position.

5. Feeding apparatus for fish and the like comprising a supporting, discharge plate having upstanding rim portions surrounding a central cavity, said discharge plate having a discharge port through the bottom thereof, a transfer plate containing a plurality of apertures and mounted on said discharge plate and within said cavity for sliding movement therein from a first position wherein said apertures are spaced from the discharge port to a second position wherein one of the apertures communicates with said discharge port, a cam member mounted on said discharge plate and within said cavity and coupled to said transfer plate for moving same at predetermined intervals from the first to the second position and back to the first position, means for actuating said cam member mounted on said upstanding rim portions of said discharge plate and overlying said cam member, and a hopper for storing a quantity of food pivotably mounted on an upstanding rim portion and overlying said transfer plate for selectively cooperating, by feeding food thereto, with said plurality of apertures in said transfer plate to feed predetermined quantities of food.

References Cited in the file of this patent
UNITED STATES PATENTS

| | | |
|---|---|---|
| 527,329 | Foster | Oct. 9, 1894 |
| 833,594 | Froman et al. | Oct. 16, 1906 |
| 1,214,881 | Berntzen | Feb. 6, 1917 |
| 1,291,882 | Hicks | Jan. 21, 1919 |
| 1,726,520 | Kramer | Aug. 27, 1929 |
| 1,989,298 | Tingley | Jan. 29, 1935 |
| 2,472,092 | Campbell | June 7, 1949 |
| 2,725,852 | Cramer | Dec. 6, 1955 |
| 2,772,659 | Tennis | Dec. 4, 1956 |